United States Patent [19]

Hirata et al.

[11] Patent Number: 5,668,202

[45] Date of Patent: Sep. 16, 1997

[54] PROCESS FOR PRODUCTION OF STABILIZED POLYCARBONATE

[75] Inventors: Masumi Hirata; Wataru Funakoshi; Katsushi Sasaki, all of Iwakuni, Japan

[73] Assignee: Teijin Limited, Osaka, Japan

[21] Appl. No.: 665,817

[22] Filed: Jun. 19, 1996

Related U.S. Application Data

[63] Continuation of Ser. No. 294,995, Aug. 24, 1994, abandoned.

[30] Foreign Application Priority Data

Aug. 26, 1993 [JP] Japan .................. 5-211367
Oct. 29, 1993 [JP] Japan .................. 5-272263
Dec. 16, 1993 [JP] Japan .................. 5-316646

[51] Int. Cl.$^6$ .................. C08K 5/50; C08K 5/41; C08K 5/42
[52] U.S. Cl. .................. 524/154; 524/156; 524/157; 524/158; 524/159; 524/912; 524/913
[58] Field of Search .................. 528/198, 199; 522/31; 524/139, 912, 913, 154, 156, 157, 158, 159, 161, 166, 83

[56] References Cited

U.S. PATENT DOCUMENTS

| | | | |
|---|---|---|---|
| 3,193,530 | 7/1965 | Oxenrides | 528/198 |
| 3,364,192 | 1/1968 | Leach | 524/912 |
| 3,418,269 | 12/1968 | Ishiwa et al. | 524/158 |
| 3,442,854 | 5/1969 | Curtius et al. | 528/198 |
| 3,894,077 | 7/1975 | Harikawa et al. | 524/157 |
| 3,933,779 | 1/1976 | Baron et al. | 524/913 |
| 4,005,057 | 1/1977 | Singh et al. | 524/912 |
| 4,070,531 | 1/1978 | Schwarze et al. | 524/156 |
| 4,143,023 | 3/1979 | Mark et al. | 524/156 |
| 4,222,910 | 9/1980 | Tokuda | 524/156 |
| 4,450,249 | 5/1984 | Schmidt et al. | 524/132 |
| 4,476,275 | 10/1984 | Giddings et al. | 525/462 |
| 4,533,722 | 8/1985 | Campbell et al. | 528/198 |
| 4,857,627 | 8/1989 | Rosenquist | 528/198 |
| 5,187,214 | 2/1993 | Govindan | 524/157 |
| 5,306,801 | 4/1994 | Sakashita et al. | 528/198 |
| 5,324,809 | 6/1994 | Sakashita et al. | 528/198 |
| 5,364,926 | 11/1994 | Sakashita et al. | 528/198 |
| 5,371,170 | 12/1994 | Sakashita et al. | 528/198 |
| 5,403,878 | 4/1995 | Ishiwara et al. | 524/158 |
| 5,496,921 | 3/1996 | Sakashita et al. | 524/158 |
| 5,602,195 | 2/1997 | Kim et al. | 524/912 |
| 5,606,008 | 2/1997 | Sakashita et al. | 524/158 |

FOREIGN PATENT DOCUMENTS

| | | |
|---|---|---|
| 699456 | 12/1964 | Canada . |
| 0 023 650 | 2/1981 | European Pat. Off. . |
| 382957 | 8/1990 | European Pat. Off. . |
| 0435124 | 7/1991 | European Pat. Off. . |
| 0 520 805 | 12/1992 | European Pat. Off. . |
| 40-7366 | 4/1965 | Japan . |
| 53-64262 | 12/1979 | Japan . |
| 60-221442 | 11/1985 | Japan . |
| 62-230835 | 10/1987 | Japan . |
| 64-14267 | 1/1989 | Japan . |
| 89-29500 | 6/1989 | Japan . |
| 3-081362 | 4/1991 | Japan . |
| 3-081363 | 4/1991 | Japan . |
| 4-001228 | 1/1992 | Japan . |
| 5-9285 | 1/1993 | Japan . |
| 5-17564 | 1/1993 | Japan . |
| 5-171024 | 7/1993 | Japan . |
| 808488 | 2/1959 | United Kingdom . |
| 808489 | 2/1959 | United Kingdom . |

*Primary Examiner*—Veronica P. Hoke
*Attorney, Agent, or Firm*—Wenderoth, Lind & Ponack

[57] ABSTRACT

A process for the production of a stabilized polycarbonate which comprises melt-polycondensing an aromatic dihydroxy compound and a carbonic acid diester in the presence of a polycondensation catalyst and then, after the reaction mixture shows an intrinsic viscosity of at least 0.1, adding at least one stabilizer selected from the group consisting of specific compounds having a sulfonates group sulfonic acid anhydride group or a sulfate group in an amount of 0.01 to 500 ppm of a polycarbonate to be formed, to form a polycarbonate having a desired intrinsic viscosity.

16 Claims, No Drawings

PROCESS FOR PRODUCTION OF STABILIZED POLYCARBONATE

This application is a continuation of now abandoned application, Ser. No. 08/294,995, filed Aug. 24, 1994.

BACKGROUND OF THE INVENTION

1. Field of the Invention

This invention relates to a process for the production of a stabilized polycarbonate. More specifically, this invention relates to a process for the production of a stabilized polycarbonate excellent in melt stability, melt moldability, resistance to hydrolysis and hue.

2. Description of Related Art

Polycarbonates are excellent in mechanical properties such as impact strength, etc. and in transparency, and find application in various fields. As a process for producing polycarbonates, there have been known an interfacial process in which a dihydroxy compound and phosgene are directly reacted and a melting process in which a dihydroxy compound and a carbonic acid diester are subjected to an ester interchange reaction under reduced pressure with heating.

The latter melting process is preferable to the former interfacial process because a polycarbonate resin can be produced advantageously at low cost and without using a solvent such as methylene chloride or the like which is desirable from the environmental aspect.

In a conventional process for producing a polycarbonate by melting, an alkali metal compound or an alkaline earth metal compound is usually used as a catalyst component. A polycarbonate resin obtained by using such a catalyst, however, involves problems that it lacks a melt stability due to the incorporated catalyst, and that in melt-molding, part of the polycarbonate resin is sometimes thermally decomposed, its molecular weight is decreased, its transparency is decreased, the polycarbonate resin is colored, and so forth.

Japanese Patent Publication No. 44,303/1979 discloses a method for stabilizing a polycarbonate resin in which methyl benzenesulfonate or a compound represented by the formula

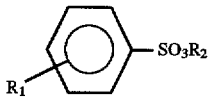

wherein $R_1$ is a $C_{1-12}$ alkyl group, and $R_2$ is a $C_{1-6}$ alkyl group, is added
to a polycarbonate resin. The polycarbonate resin obtained by this method, however, tends to yellow in melt-molding and is still insufficient in resistance to hydrolysis. Accordingly, it is demanded to develop a polymerization catalyst and additives or a polymerization technique to solve such problems.

Japanese Laid-open Patent Application No. 171,024/1993 (Kokai Sho 64-13267) discloses a polycarbonate resin composition comprising 100 parts by weight of a polycarbonate resin, 0.1 to 20 parts by weight of a sulfonic acid phosphonium salt represented by the formula

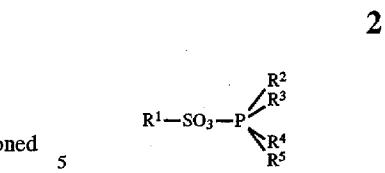

wherein $R^1$ is a $C_{1-40}$ alkyl group or an aryl group, and each of $R^2$ to $R^5$ is independently H, a $C_{1-10}$ alkyl group or an aryl group,
and 0.01 to 3.0 parts by weight of a sulfur-containing ester compound.

Japanese Laid-open Patent Application (Kokai) No. 14,267/1989 discloses a polycarbonate resin composition corresponding to the above composition in which the sulfur-containing ester compound is replaced with a phosphite ester.

The above two polycarbonate resin compositions containing the sulfonic acid phosphonium salt are both to impart an antistatic property, and for this purpose the sulfonic acid phosphonium salt has to be used in an amount as large as 0.1 to 20 parts by weight per 100 parts by weight of the polycarbonate resin. Therefore, this polycarbonate resin involves a problem that there occur results which are not necessarily desirable for important basic properties of the polycarbonate resin, such as a hue and a resistance to hydrolysis.

Japanese Laid-open Patent Application No. 9,285/1993 (Kokai Hei 5-9285) discloses a process for producing a polycarbonate, which comprises adding 0.05 to 10 ppm of a sulfonic acid compound represented by the formula

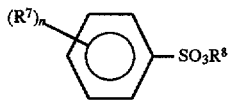

wherein $R^7$ is a $C_{1-6}$ hydrocarbon group which may be substituted with halogen, $R^8$ is H or a $C_{1-8}$ hydrocarbon group which may be substituted with halogen, and n is an integer of 0 to 3,
to a polycarbonate obtained by melt polycondensation of an aromatic dihydroxy compound and a carbonic acid diester. This document simply describes a compound having a primary alkyl group as a compound in which the $C_{1-8}$ hydrocarbon group is an alkyl group.

British Patent No. 808,488 specification discloses a process for the production of high-molecular-weight fiber and film forming polycarbonates by interesterification or polycondensation in the presence of basic catalysts which comprises neutralizing the catalysts in the course of or at the end of the interesterification or polycondensation respectively by adding base-binding materials to the melt. Dialkyl sulphates such as dimethyl sulphate and dibutyl sulphate are shown as the base-binding materials.

British Patent No. 808,489 specification discloses also a process for the production of high-molecular-weight polycarbonates by interesterification. Towards the end of the interesterification, basic catalysts are neutralized with base-binding materials, especially volatile base-binding materials such as dimethyl sulphate.

Japanese Laid-open Patent Application No. 17,564/1993 (Kokai Hei 5-17564) discloses a process for producing a polycarbonate, which comprises melt-polycondensing an aromatic dihydroxy compound and a carbonic acid diester in the presence of a catalyst formed of a nitrogen-containing basic compound (1st step), and then adding a nitrogen-containing basic compound at least once and further a sulfonic acid compound represented by the formula

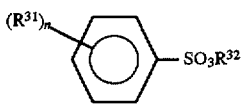

wherein $R^{31}$ is a $C_{1-6}$ hydrocarbon group which may be substituted with halogen, $R^{32}$ is H or a hydrocarbon group which may be substituted with halogen, and n is an integer of 0 to 3, in an amount of 0.05 to 10 ppm of a polycarbonate to be obtained in subsequent polymerization steps.

It is an object of this invention to provide a process for the production of a stabilized polycarbonate.

Another object of this invention is to provide a process for the production of a polycarbonate excellent in melt stability, resistance to hydrolysis, melt moldability and hue.

The other objects and advantages of this invention will be made clear from the following explanation.

SUMMARY OF THE INVENTION

In accordance with this invention, the above objects and advantages of this invention are achieved by a process for the production of a stabilized polycarbonate which comprises melt-polycondensing an aromatic dihydroxy compound and a carbonic acid diester in the presence of a polycondensation catalyst and then, after the reaction mixture shows an intrinsic viscosity of at least 0.1, adding at least one stabilizer selected from the group consisting of a compound of the formula (I)

wherein $A^1$ is a hydrocarbon group having a valence of m, which may have a substituent, $Y^1$ is a single bond or an oxygen atom, $X^1$ is a secondary or tertiary monovalent hydrocarbon group, a metal cation of one equivalent, an ammonium cation or a phosphonium cation, and m is an integer of 1 to 4, provided that when $Y^1$ is a single bond, all of $X^1$s in an amount of m cannot be metal cations of one equivalent, a compound of the formula (II)

wherein $A^2$ is a divalent hydrocarbon group, $X^2$ is a secondary, tertiary or quaternary ammonium cation or a secondary, tertiary or quaternary phosphonium cation, and $Y^1$ is as defined above, a compound of the formula (III)

wherein $A^3$ is a hydrocarbon group having a valence of n, $^+X^3$ is a secondary, tertiary or quaternary ammonium cation or a secondary, tertiary or quaternary phosphonium cation, R is a monovalent hydrocarbon group, n is an integer of 2 to 4, and $Y^1$ is as defined above, and a compound of the formula (IV)

wherein $A^5$ is a monovalent or divalent hydrocarbon group, $A^4$ is a divalent hydrocarbon group, each of $Ad^1$ and $Ad^2$ is independently an acid anhydride group selected from the group consisting of —$SO_2$—O—$SO_2$—, —$SO_2$—O—CO— and —CO—O—$SO_2$—, and l is 0 or 1, provided that when l is 0, —$(Ad^2$—$A^5)_l$ is a hydrogen atom or a bond between $A^4$ and $A^5$, in which $A^5$ is a divalent hydrocarbon group or a single bond, in an amount of 0.01 to 500 ppm of a polycarbonate to be formed, to form a polycarbonate having a desired intrinsic viscosity.

The process of this invention comprises, as stated above, melt-polymerizing an aromatic dihydroxy compound and a carbonic acid diester in the presence of a polycondensation catalyst, and then, after the reaction mixture shows an intrinsic viscosity of at least 0.1, adding at least one stabilizer selected from the compounds of the formulas (I) to (IV) in an amount of 0.01 to 500 ppm of a polycarbonate to be formed, to form a polycarbonate having a desired intrinsic viscosity.

DETAILED DESCRIPTION OF THE PREFERRED EMBODIMENT(S)

The aromatic dihydroxy compound used in this invention is preferably a compound of the formula (A)

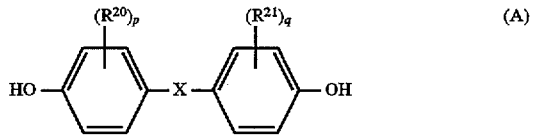

In the above formula, X is

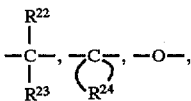

—S—, —SO— or —$SO_2$—, in which each of $R^{22}$ and $R^{23}$ is independently a hydrogen atom, an alkyl group having 1 to 5 carbon atoms or an aryl group having 6 to 10 carbon atoms which may be substituted. Examples of the alkyl group are methyl, ethyl and propyl groups, and an example of the aryl group is a phenyl group. $R^{24}$ is an alkylene group having 3 to 8 carbon atoms, and examples thereof include pentylene and hexylene groups. Each of $R^{20}$ and $R^{21}$ is independently a halogen atom or an alkyl group having 1 to 5 carbon atoms. Examples of the halogen atom are chlorine and bromine, and examples of the alkyl group are methyl and tert-butyl groups. Each of p and q is independently 0, 1 or 2.

Specific examples of the aromatic dihydroxy compound include bis(hydroxyaryl)alkanes such as bis(4-hydroxyphenyl)methane, 1,1-bis(4-hydroxyphenyl)ethane, 2,2-bis(4-hydroxyphenyl)propane, 2,2-bis(4-hydroxyphenyl)butane, 2,2-bis(4-hydroxyphenyl)octane, bis(4-hydroxyphenyl)phenylmethane, 2,2-bis(4-hydroxy-3-methylphenyl)propane, 1,1-bis(4-hydroxy-tert-butylphenyl) propane and 2,2-bis(4-hydroxy-3-bromophenyl)propane; bis(hydroxyaryl)cycloalkanes such as 1,1-bis(4-hydroxyphenyl)cyclopentane and 1,1-bis(4-hydroxyphenyl)

cyclohexane; dihydroxyaryl ethers such as 4,4'-dihydroxydiphenyl ether and 4,4'-dihydroxy-3,3'-dimethylphenyl ether; dihydroxydiaryl sulfides such as 4,4'-dihydroxydiphenyl sulfide and 4,4'-dihydroxy-3,3'-dimethyldiphenyl sulfide; dihydroxydiaryl sulfoxides such as 4,4'-dihydroxydiphenyl sulfoxide and 4,4'-dihydroxy-3,3'-dimethyldiphenyl sulfoxide; and dihydroxydiarylsulfones such as 4,4'-dihydroxydiphenylsulfone and 4,4'-dihydroxy-3,3'-dimethyldiphenylsulfone. Of these, 2,2-bis(4-hydroxyphenyl)propane is especially preferable.

These aromatic dihydroxy compounds can be used either singly or in combination.

The carbonic acid diester used in this invention is preferably an ester of aryl having 6 to 10 carbon atoms, aralkyl, alkyl having 1 to 5 carbon atoms and cycloalkyl having 3 to 8 carbon atoms, each of which may be substituted.

Specific examples of the carbonic acid diester include diphenyl carbonate, ditolyl carbonate, bis(chlorophenyl) carbonate, m-cresyl carbonate, dinaphthyl carbonate, bis(diphenyl) carbonate, diethyl carbonate, dimethyl carbonate, dibutyl carbonate, and dicyclohexyl carbonate. Of these, diphenyl carbonate is especially preferable.

The amount of the carbonic acid diester used is 80 to 300 mol %, preferably 90 to 280 mol %, especially preferably 95 to 250 mol % of the above aromatic dihydroxy compound.

In this invention, as a polycondensation catalyst used in this invention, those which give a less colored polycarbonate polymer having good qualities from the aforesaid carbonic acid diester and aromatic dihydroxy compound as starting materials with less side reaction is preferably used. For example, at least one compound selected from the group consisting of an alkali metal compound, an alkaline earth metal compound and a nitrogen-containing basic compound is preferably used as the polycondensation catalyst. It is advantageous to use other catalysts concurrently with the above polycondensation catalyst.

The alkali metal compound as the polycondensation catalyst includes hydroxides, bicarbonates, carbonates, acetates, nitrates, nitrites, sulfites, cyanates, thiocyanates, stearates, borohydrides, benzoates, hydrogenphosphates, bisphenol salts and phenol salts of alkali metals. Specific examples of the alkali metal compound include sodium hydroxide, potassium hydroxide, lithium hydroxide, sodium bicarbonate, potassium bicarbonate, lithium bicarbonate, sodium carbonate, potassium carbonate, lithium carbonate, sodium acetate, potassium acetate, lithium acetate, sodium nitrate, potassium nitrate, lithium nitrate, sodium nitrite, potassium nitrite, lithium nitrite, sodium sulfite, potassium sulfite, lithium sulfite, sodium cyanate, potassium cyanate, lithium cyanate, sodium thiocyanate, potassium thiocyanate, lithium thiocyanate, sodium stearate, potassium stearate, lithium stearate, sodium borohydride, lithium borohydride, potassium borohydride, sodium borophenylate, sodium benzoate, potassium benzoate, lithium benzoate, disodium hydrogenphosphate, dipotassium hydrogenphosphate, dilithium hydrogenphosphate, bisphenol A disodium salt, bisphenol A dipotassium salt, bisphenol A dilithium salt, phenol sodium salt, phenol potassium salt and phenol lithium salt.

The alkaline earth metal compound as the polycondensation catalyst includes hydroxides, bicarbonates, carbonates, acetates, nitrates, nitrites, sulfites, cyanates, thiocyanates, stearates, borohydrides, benzoates, hydrogenphosphates, bisphenol salts and phenol salts of alkaline earth metals. Specific examples of the alkaline earth metal compound include calcium hydroxide, barium hydroxide, magnesium hydroxide, strontium hydroxide, calcium bicarbonate, barium bicarbonate, magnesium bicarbonate, strontium bicarbonate, calcium carbonate, barium carbonate, magnesium carbonate, strontium carbonate, calcium acetate, barium acetate, magnesium acetate, strontium acetate, calcium nitrate, barium nitrate, magnesium nitrate, strontium nitrate, calcium nitrite, barium nitrite, magnesium nitrite, strontium nitrite, calcium cyanate, barium cyanate, magnesium cyanate, strontium cyanate, calcium thiocyanate, barium thiocyanate, magnesium thiocyanate, strontium thiocyanate, calcium stearate, barium stearate, magnesium stearate and strontium stearate.

Examples of the nitrogen-containing basic compound as the polycondensation catalyst includes hydroxides of ammonium having alkyl, aryl and aralkyl groups, such as tetramethylammonium hydroxide ($Me_4NOH$), tetraethylammonium hydroxide ($Et_4NOH$), tetrabutylammonium hydroxide ($Bu_4NOH$) and trimethylbenzylammonium hydroxide ($\Phi$—$CH_2(Me)_3NOH$); tertiary amines such as triethylamine, tributylamine, dimethylbenzylamine and hexadecyldimethylamine; secondary amines of the formula $R^o{}_2NH$ (wherein $R^o$ is alkyl such as methyl or ethyl, or an aryl group such as phenyl or toluyl); primary amines of the formula $R^oNH_2$ (wherein $R^o$ is as defined above); imidazoles such as 2-methylimidazole and 2-phenylimidazole; and basic salts such as tetramethylammonium borohydride ($Me_4NBH_4$), tetrabutylammonium borohydride ($Bu_4NBH_4$). tetrabutylammonium tetraphenylborate ($Bu_4NBPh_4$) and tetramethylammonium tetraphenylborate ($Me_4NBPh_4$).

The other metal catalyst can be used concurrently with the above polycondensation catalyst. Preferable examples of the other metal catalyst include metallic elements of groups IIB, IIIB, IVA and IVB in the periodic table and their compounds.

Examples of the metal compounds used as the polycondensation catalyst include zinc compounds, e.g., carboxylates of zinc such as $Zn(OAc)_2$ and $Zn(OBz)_2$, oxides and sulfides of zinc such as $ZnO$ and $ZnS$, hydroxides of zinc such as $Zn(OH)_2$, organic zinc compounds such as $(C_2H_5)_2Zn$, $Ph_2Zn$, $C_2H_5ZnOC_2H_5$, $PhZnOAc$ and $C_4H_5ZnOAc$, alkoxides and aryloxides of zinc such as $Zn(OC_2H_5)_2$ and $Zn(OPh)_2$, and chelate compounds of zinc such as $Zn(acac)_2$, and $Zn(oxin)_2$; aluminum compounds, e.g., carboxylates of aluminum such as $Al(OAc)_3$ and $Al(OBz)_3$, oxides of aluminum such as $Al_2O_3$, hydroxides of aluminum such as $Al(OH)_3$, organoaluminum compounds such as $Ph_3Al$, alkoxides and aryloxides of aluminum such as $Al(OCH_3)_3$, $Al(OC_3H_7-i)_3$ and $Al(OPh)_3$, and chelate compounds of aluminum such as $Al(acac)_3$ and $Al(oxin)_3$; gallium compounds, e.g., carboxylates of gallium such as $Ga(OAc)_3$, $Ga(OBz)_3$ and $GaO(OAc)$, oxides of gallium such as $Ga_2O_3$, hydroxides of gallium such as $Ga(OH)_3$, organogallium compounds such as $(CH_3)_3Ga$ and $Ph_3Ga$, alkoxides and aryloxides of gallium such as $Ga(OCH_3)_3$ and $Ga(OPh)_3$, and chelate compounds of gallium such as $Ga(acac)_3$; indium compounds, e.g., carboxylates of indium such as $In(OAc)_3$, oxides of indium such as $In_2O_3$, organoindium compounds such as $(C_2H_5)_3In$ and $Ph_3In$, and chelate compounds of indium such as $In(acac)_3$; germanium compounds, e.g., carboxylates of germanium such as $Ge(OAc)_4$ and $Ge(OBz)_4$, oxides of germanium such as $GeO_2$, hydroxides of germanium such as $Ge(OH)_2$ and $Ge(OH)_4$, organogermanium compounds such as $(C_2H_5)_4Ge$, $Ph_4Ge$, $[(C_4H_9)_2GeO]_n$ and $[Ph_2GeO]_n$, alkoxides and aryoxides of germanium such as $Ge(OCH_3)_4$ and $Ge(OPh)_4$; tin compounds, e.g., carboxylates of tin such as $Sn(OAc)_2$, $Sn(OAc)_4$ and $Sn(OBz)_4$, organotin compounds such as $(C_2H_5)_4Sn$ and $Ph_4Sn$, organotin oxides such as $(C_2H_5)_4Sn$ and $Ph_2Sn$, organotin hydroxides such as $(C_4H_9)_2SnO$, $[(C_4H_9)_2SnO]_n$, $[C_8H_{17})_2SnO]_n$ and $[(C_4H_9)PhSnO]_n$, organotin carboxylates such as $(C_4H_9)_2Sn(OAc)_2$ and dibutyltin laurate, oxides of tin such as SnO and $SnO_2$, hydroxides of tin such as $Sn(OH)_2$ and $Sn(OH)_4$, and organotin alkoxides and aryloxides such as $Sn(OCH_3)_2$, $Sn(OCH)_3$, $Sn(OC_4H_9)_4$, $Sn(OPh)_2$, $Sn(OPh)_4$ and $(C_4H_9)Sn(OCH_3)_2$; lead compounds, e.g., carboxylates of lead such as $Pb(OAc)_2$, $Pb(OAc)_4$ and $Pb(OBz)_2$, inorganic acid salts of lead such as $PbCO_3$ and $2PbCO_3\cdot Pb(OH)_2$, complex compounds of lead such as $Na_2[Pb(OH)_6]$, oxides of lead such as PbO, $PbO_2$ and $Pb_3O_4$, hydroxides of lead such as $Pb(OH)_2$, organolead compounds such as $(C_4H_9)_4Pb$, $Ph_4Pb$ and $(C_2H_5)_3Pb$ (OAc), alkoxides and aryloxides of lead and organolead such as $Pb(OCH_3)_4$ and $Pb(OPh)_4$ and $(C_4H_9)_2Pb(OPh)_2$; and zirconium compounds, e.g., carboxylates of zirconium such as $Zr(OAc)_4$ and $Zr(OBz)_4$, oxides of zirconium such as $ZrO_2$, alkoxides and aryloxides of zirconium such as $Zr(OC_4H_9)_4$ and $Zr(OPh)_4$, organozirconium compounds such as $Zr(OAc)_3(\pi\text{-}C_2H_5)$ and $ZrH_2(\pi\text{-}C_2H_5)_2$, and chelate compounds of zirconium such as $Zr(acac)_4$. These catalysts can be used either singly or in combination.

The polycondensation catalyst can be used in an amount of 0.01 to 50 ppm of the polycarbonate to be formed. When the amount of the polycondensation catalyst is deviated from the above range, there occur undesirably the problems that an adverse effect is produced to properties of the obtained polycarbonate, and the polymerization reaction does not sufficiently proceed, making it impossible to form a high-molecular-weight polycarbonate.

When the aromatic dihydroxy compound and the carbonic acid diester are polycondensed in the presence of the above polycondensation catalyst, a dicarboxylic acid or a dicarboxylic acid ester may be contained. Examples of the dicarboxylic acid or the dicarboxylic acid ester include terephthalic acid, isophthalic acid, diphenyl terephthalate and diphenyl isophthalate.

When the above dicarboxylic acid or dicarboxylic acid ester is used concurrently with the carbonic acid diester, a polyester polycarbonate is obtained. The process for the production of the polycarbonate in this invention shall be, therefore, understood to include the above process for the production of the polyester polycarbonate.

The dicarboxylic acid or the dicarboxylic acid ester can be used in an amount of 90 mol % or less, especially 80 mol % or less of the aromatic dihydroxy compound.

The stabilizer used in the polycondensation reaction of this invention is represented by the formulas (I), (II), (III) or (IV). The stabilizer is added after an intrinsic viscosity of the polycondensate has reached at least 0.1. Hereinafter, the stabilizer will be explained.

Stabilizer of the formula (I)

$$A^1-(Y^1-SO_3X^1)_m \quad \text{(I)}$$

wherein $A^1$ is a hydrocarbon group having a valence of m, which may have a substituent, $Y^1$ is a single bond or an oxygen atom, $X^1$ is a secondary or tertiary monovalent hydrocarbon group, a metal cation of one equivalent, an ammonium cation, or a phosphonium cation, and m is an integer of 1 to 4, provided that when $Y^1$ is a single bond, all of $X^1$s in an amount of m cannot be metal cations of one equivalent.

Preferable examples of the hydrocarbon group having a valence of m include a saturated aliphatic hydrocarbon group, an aromatic hydrocarbon group and a saturated aliphatic-aromatic hydrocarbon group, each of these groups having a valence of m.

$Y^1$ is a single bond or an oxygen atom.

$X^1$ is a secondary or tertiary monovalent hydrocarbon group, a metal cation of one equivalent, an ammonium cation or a phosphonium cation.

The secondary or tertiary monovalent hydrocarbon group is, for example, preferably a secondary or tertiary alkyl group of the formula (I)-d

wherein $R^{15}$ is a hydrogen atom or an alkyl group having 1 to 5 carbon atoms, $R^{16}$ is a hydrogen atom, a phenyl group or an alkyl group having 1 to 5 carbon atoms, and $R^{17}$ is the same as or different from $R^{15}$ and has the same definition as $R^{15}$, provided that two of $R^{15}$, $R^{16}$ and $R^{17}$ cannot be hydrogen atoms.

Especially preferable is that each of $R^{15}$ and $R^{17}$ is independently a hydrogen atom, a methyl group, an ethyl group or a propyl group, and $R^{16}$ is a methyl group or a phenyl group.

Examples of the metal cation of one equivalent include alkali metal cations such as lithium, sodium and potassium; ½ of alkaline earth metal cations such as calcium and barium; and ⅓ of trivalent metal cations such as aluminum.

The ammonium cation includes, for example, a cation of the formula (I)-a

wherein each of $R^1$, $R^2$, $R^3$ and $R^4$ is independently a hydrogen atom or a monovalent hydrocarbon group.

In the formula (I)-a, preferable examples of the monovalent hydrocarbon group indicated by $R^1$, etc. include an alkyl group having 1 to 20 carbon atoms, an aryl group having 1 to 10 carbon atoms, and an aralkyl group having 1 to 10 carbon atoms.

The phosphonium cation includes, for example, a cation of the formula (I)-b

wherein each of $R^5$, $R^6$, $R^7$ and $R^8$ is independently a hydrogen atom or a monovalent hydrocarbon group.

In the formula (I)-b, examples of the monovalent hydrocarbon group indicated by $R^5$, etc. are the same as those of the monovalent hydrocarbon group shown in the formula (I)-a.

Of these examples of $X^1$, the secondary or tertiary alkyl group, the alkali metal cation, the cation of the formula (I)-a and the cation of the formula (I)-b are preferable.

In the formula (I), m is an integer of 1 to 4, preferably 1 or 2.

For convenience sake, the compounds of the formula (I) are divided into two groups according to the definition of $Y^1$: a compound group in which $Y^1$ is a single bond and a compound group in which $Y^1$ is an oxygen atom. The compound group in which $Y^1$ is a single bond and m is 1, for example, is represented by the formula (I)-1

$$A^1—SO_3X^1 \qquad \text{(I)-1}$$

wherein $A^1$ and $X^1$ are as defined in the formula (I).

Of the compounds of the formula (I)-1, preferable is a compound wherein $A^1$ is a monovalent saturated aliphatic hydrocarbon group or a monovalent saturated aliphatic-aromatic hydrocarbon group; especially preferable is a compound wherein $A^1$ is a group of the formula (I)-c

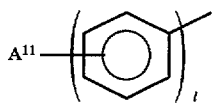

wherein $A^{11}$ is an alkyl group having 1 to 18 carbon atoms, and l is an integer of 0 or 1.

The compound group in which $Y^1$ is an oxygen atom and m is 1, for example, is represented by the formula (I)-2.

$$A^1—O—SO_3X^1 \qquad \text{(I)-2}$$

wherein $A^1$ and $X^1$ are as defined in the formula (I).

Of the compounds of the formula (I)-2, preferable is a compound wherein $A^1$ is a monovalent saturated aliphatic hydrocarbon group; especially preferable is a compound wherein $A^1$ is an alkyl group having 1 to 18 carbon atoms.

Specific examples of the compounds of the formula (I) are as follows.

Compounds of the formula (I) in which $Y^1$ is a single bond, $X^1$ is a secondary or tertiary monovalent hydrocarbon and m is 1:

Benzyl benzenesulfonate, 2-phenyl-2-propyl benzenesulfonate, 2-phenyl-2-butyl benzenesulfonate, benzyl toluenesulfonate, 2-phenyl-2-propyl toluenesulfonate, 2-propyl-2-butyl toluenesulfonate, benzyl octylbenzenesulfonate, 2-phenyl-2-propyl octylbenzenesulfonate, 2-phenyl-2-butyl octylbenzenesulfonate, benzyl dodecylbenzenesulfonate, 2-phenyl-2-propyl dodecylbenzenesulfonate, and 2-phenyl-2-butyl dodecylbenzenesulfonate.

Compounds of the formula (I) in which $Y^1$ is a single bond, $X^1$ is a phosphonium cation of the formula (I)-b and m is 1:

Tetramethylphosphonium hexylsulfonate,
tetraethylphosphonium hexylsulfonate,
tetrabutylphosphonium hexylsulfonate,
tetrahexylphosphonium hexylsulfonate
tetraoctylphosphonium hexylsulfonate,
tetramethylphosphonium octylsulfonate,
tetraethylphosphonium octylsulfonate,
tetrabutylphosphonium octylsulfonate,
tetrahexylphosphonium octylsulfonate,
tetraoctylphosphonium octylsulfonate,
tetramethylphosphonium decylsulfonate,
tetraethylphosphonium decylsulfonate,
tetrabutylphosphonium decylsulfonate,
tetrahexylphosphonium decylsulfonate,
tetraoctylphosphonium decylsulfonate,
tetramethylphosphonium dodecylsulfonate,
tetraethylphosphonium dodecylsulfonate,
tetrabutylphosphonium dodecylsulfonate,
tetrahexylphosphonium dodecylsulfonate,
tetraoctylphosphonium dodecylsulfonate,
tetramethylphosphonium hexadecylsulfonate,
tetraethylphosphonium hexadecylsulfonate,
tetrabutylphosphonium hexadecylsulfonate,
tetrahexylphosphonium hexadecylsulfonate,
tetraoctylphosphonium hexadecylsulfonate,
tetramethylphosphonium benzenesulfonate,
tetraethylphosphonium benzenesulfonate,
tetrabutylphosphonium benzenesulfonate,
tetrahexylphosphonium benzenesulfonate,
tetraoctylphosphonium benzenesulfonate,
tetramethylphosphonium toluenesulfonate,
tetraethylphosphonium toluenesulfonate,
tetrabutylphosphonium toluenesulfonate,
tetrahexylphosphonium toluenesulfonate,
tetraoctylphosphonium toluenesulfonate,
tetramethylphosphonium dodecylbenzenesulfonate,
tetraethylphosphonium dodecylbenzenesulfonate,
tetrabutylphosphonium dodecylbenzenesulfonate,
tetrahexylphosphonium dodecylbenzenesulfonate, and
tetraoctylphosphonium dodecylbenzenesulfonate.

Compounds of the formula (I) in which $Y^1$ is an oxygen atom, $X^1$ is a secondary or tertiary monovalent hydrocarbon group and m is 1: (it is preferable that the total carbon number of $A^1$ and $X^1$ is 8 to 40.)

Dibutyl sulfate, dipentyl sulfate, dihexyl sulfate, dioctyl sulfate, dinonyl sulfate, didecyl sulfate, ditridecyl sulfate, ditetradecyl sulfate, dihexadecyl sulfate, dicyclohexyl sulfate, and dibenzyl sulfate.

The alkyl group in these specific examples shall be understood to be a secondary or tertiary alkyl.

Compounds of the formula (I) in which $Y^1$ is an oxygen atom, $X^1$ is a metal cation of one equivalent and m is 1:

Sodium octylsulfate, potassium octylsulfate, cesium octylsulfate, lithium decylsulfate, sodium decylsulfate, sodium dodecylsulfate, potassium dodecylsulfate, lithium tetradecylsulfate, sodium tetradecylsulfate, potassium decylsulfate, lithium hexadecylsulfate, sodium oleylsulfate, and potassium hexadecylsulfate.

Compounds of the formula (I) in which $Y^1$ is an oxygen atom and $X^1$ is an ammonium cation of the formula (I)-a:

Ammonium salts such as ammonium octylsulfate, ammonium decylsulfate, ammonium dodecylsulfate and ammonium hexadecylsulfate; primary ammonium salts such as methylammonium hexylsulfate, methylammonium octylsulfate, methylammonium hexadecylsulfate, ethylammonium hexylsulfate, butylammonium nonadecylsulfate, hexylammoniium octadecylsulfate, decylammonium ethylsulfate, decylammonium butylsulfate, decylammonium decylsulfate, dodecylammonium methylsulfate, dodecylammonium ethylsulfate, dodecylammonium octylsulfate, tetradecylammonium butylsulfate, pentadecylammonium methylsulfate, hexadecylammonium butylsulfate, hexadecylammonium octylsulfate, hexadecylammonium decylsulfate and hexadecylammonium dodecylsulfate; secondary ammonium salts such as dimethylammonium hexylsulfate, dimethylammonium octylsulfate, dimethylammonium tetradecylsulfate, diethylammonium octadecylsulfate, butylmethylammonium tetradecylsulfate, hexylmethylammonium tetradecylsulfate, decylmethylammonium methylsulfate, decylethylammonium ethylsulfate, decylmethylammonium octylsulfate, dodecylmethylammonium methylsulfate, tetradecylmethylammonium methylsulfate, tetradecylethylammonium ethylsulfate, pentadecylmethylammonium methylsulfate, pentadecylethylammonium ethylsulfate, hexadecylmethylammonium methylsulfate and hexadecylethylammonium ethylsulfate; tertiary ammonium salts such as trimethylammonium octylsulfate, trimethylammonium decylsulfate, butyldimethylammonium decylsulfate, hexyldimethylammonium dodecylsulfate, decyldimethylammonium methylsulfate, decyldimethylammonium tridecylsulfate, dodecyldiethylammonium ethylsulfate, dodecyldibutylammonium butylsulfate, dodecyldimethylammonium tetradecylsulfate, tetradecyldimethylammonium methylsulfate, tetradecylmethylethylammonium methylsulfate, pentadecyldimethylammonium ethylsulfate, hexadecyldimethylammonium methylsulfate and hexadecylmethylethylammonium ethylsulfate; and quaternary ammonium salts such as tetramethylammonium hexylsulfate, tetraethylammonium tridecylsulfate, butyltrimethylammonium octylsulfate, decyltrimethylammonium methylsulfate, decyltriethylammonium ethylsulfate, decyltrimethylammonium hexadecylsulfate, pentadecyltrimethylammonium methylsulfate and pentadecyldimethylethylammonium ethylsulfate.

Preferable of these compounds are lithium decylsulfate, sodium decylsulfate, sodium dodecylsulfate, potassium dodecylsulfate, lithium tetradecylsulfate, sodium tetradecylsulfate, lithium hexadecylsulfate, sodium oleylsulfate, dodecylammonium ethylsulfate, dodecylmethylammonium methylsulfate, dodecylmethylammonium methylsulfate, decylethylammonium ethylsulfate, tetradecylethylammonium ethylsulfate, tetradecylmethylethylammonium methylsulfate, pentadecylethylammonium ethylsulfate, hexadecylmethylammonium methylsulfate, hexadecylethylammonium ethylsulfate, decyldimethylammonium methylsulfate, hexadecyldimethylammonium methylsulfate, pentadecyldimethylammonium methylsulfate, hexadecylmethylethylammonium ethylsulfate, pentadecyldimethylethylammonium ethylsulfate, decyldimethylammonium tridecylsulfate, tetradecyldimethylammonium methylsulfate, dodecyldiethylammonium ethylsulfate, tetradecyldiethylammonium ethylsulfate, decyltrimethylammonium methylsulfate, pentadecyltrimethylammonium methylsulfate and decyltriethylammonium ethylsulfate.

Stabilizer of the formula (II)

$$^{\oplus}X^2-A^2-Y^1-SO_3^{\ominus} \quad (II)$$

wherein $A^2$ is a divalent hydrocarbon group, $\oplus X^2$ is an ammonium cation or a phosphonium cation, and $Y^1$ is as defined above.

In the above formula (II), the divalent hydrocarbon group of $A^2$ is preferably a divalent saturated aliphatic hydrocarbon group, more preferably a divalent saturated aliphatic hydrocarbon group having 1 to 20 carbon atoms.

$\oplus X^2$ is an ammonium cation or a phosphonium cation. The ammonium ion is preferably a cation of the formula (II)-a

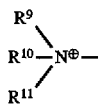

(II)-a wherein each of $R^9$, $R^{10}$ and $R^{11}$ is independently a hydrogen atom or a monovalent hydrocarbon group.

Examples of the monovalent hydrocarbon group of $R^9$, etc. are the same as those shown in the above formula (I)-a.

The phosphonium cation is preferably a cation of the formula (II)-b

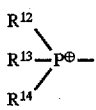

(II)-b wherein each of $R^{12}$, $R^{13}$ and $R^{14}$ is independently a hydrogen atom or a monovalent hydrocarbon group.

Examples of the monovalent hydrocarbon group of $R^{12}$, etc. are the same as those shown in the formula (I)-b.

Specific examples of the compound of the formula (II) are as follows.

$^{\ominus}SO_3-(-CH_2)_3-N^{\oplus}(CH_3)_3$, $^{\ominus}SO_3-(-CH_2)_3-N^{\oplus}(C_2H_5)_3$, $^{\ominus}SO_3-(-CH_2)_3-P^{\oplus}(C_4H_9)_3$, $^{\ominus}SO_3-(-CH_2)_3-P^{\oplus}(C_6H_5)_3$, $^{\ominus}SO_3-(-CH_2)_{15}-N^{\oplus}(C_2H_5)_3$, $^{\ominus}SO_3-(-CH_2)_{15}-P^{\oplus}(C_6H_5)_3$, $^{\ominus}SO_3-(-CH_2)_{15}-P^{\oplus}(C_4H_9)_3$.

Stabilizer of the formula (III)

$$A^3-(^{\oplus}X^3)_n\cdot(R-Y^1-SO_3^{\ominus})_n \quad (III)$$

wherein $A^3$ is a hydrocarbon group having a valence of n, $^{\oplus}X^3$ is an ammonium cation or a phosphonium cation, R is a monovalent hydrocarbon, n is an integer of 2 to 4, and $Y^1$ is as defined above.

The hydrocarbon group having a valence of n, which is indicated by $A^3$, is preferably a saturated aliphatic hydrocarbon group, an aromatic hydrocarbon group or a saturated aliphatic-aromatic hydrocarbon group, each of these groups having a valence of n.

Examples of the ammonium cation and the phosphonium cation of $^{\oplus}X^3$ are the same as those shown in the formulas (II)-a and (II)-b.

R is the monovalent hydrocarbon group. Preferable examples of the monovalent hydrocarbon group include alkyl, aryl and aralkyl groups. Preferably, the alkyl group is an alkyl group having 1 to 20 carbon atoms, the aryl group is an aryl group having 1 to 20 carbon atoms, and the aralkyl is an aralkyl group having 1 to 20 carbon atoms.

n is 2, 3 or 4, and $Y^1$ is a single bond or an oxygen atom as defined above.

Specific examples of the compound of the formula (III) are as follows.

Compounds of the formula (III) in which $Y^1$ is a single bond, $^{\oplus}X^3$ is an ammonium cation of the formula (II)-a and n is 2:

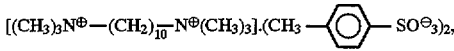

-continued

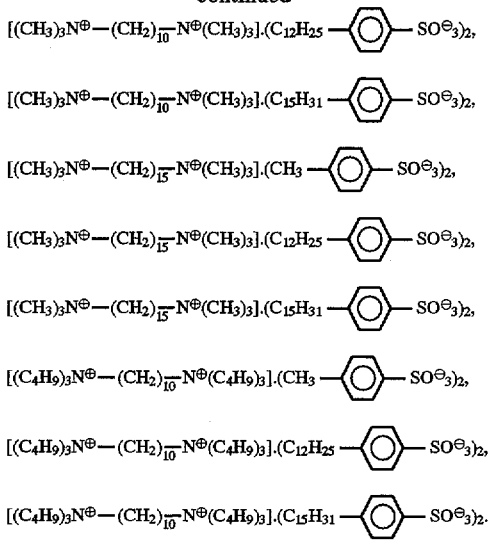

Compounds of the formula (III) in which $Y^1$ is an oxygen atom, $^\oplus X^3$ is an ammonium cation of the formula (II)-a and n is 2:

$[(CH_3)_3N^\oplus—(CH_2)_{10}—N^\oplus(CH_3)_3].(C_{15}H_{31}—SO^\ominus_4)_2$,
$[(CH_3)_3N^\oplus—(CH_2)_{15}—N^\oplus(CH_3)_3].(C_{15}H_{31}—SO^\ominus_4)_2$,
$[(C_4H_9)_3N^\oplus—(CH_2)_{10}—N^\oplus(C_4H_9)_3].(C_{15}H_{31}—SO^\ominus_4)_2$.

Compounds of the formula (III) in which $Y^1$ is a single bond, $^\oplus X^3$ is a phosphonium cation of the formula (II)-b and n is 2:

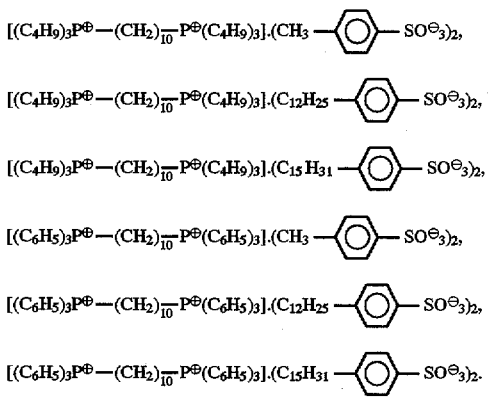

Compounds of the formula (III) in which $Y^1$ is an oxygen atom, $^\oplus X^3$ is a phosphonium cation of the formula (II)-b and n is 2:

$[(C_4H_9)_3P^\oplus—(CH_2)_{10}—P^\oplus(C_4H_9)_3].(C_{15}H_{31}—SO^\ominus_4)_2$,
$[(C_6H_5)_3P^\oplus—(CH_2)_{10}—P^\oplus(C_6H_5)_3].(C_{15}H_{31}—SO^\ominus_3)_2$, Stabilizer of the formula (IV)

$$A^5—Ad^1—A^4—(Ad^2—A^5)_l \qquad (IV)$$

wherein $A^5$ is a monovalent or divalent hydrocarbon group,
$A^4$ is a divalent hydrocarbon group,
each of $Ad^1$ and $Ad^2$ is independently an acid anhydride group selected from the group consisting of —SO$_2$—O—SO$_2$—, —SO$_2$—O—CO— and —CO—O—SO$_2$—, and l is 0 or 1,
provided that when l is 0, —(Ad$^2$—A$^5$)l is a hydrogen atom or a bond between $A^4$ and $A^5$, in which $A^5$ is a divalent hydrocarbon group or a single bond.

For convenience sake, the compounds of the formula (IV) can be grouped into three compound groups according to the definition of l:

a compound of the formula (IV)-1

$$A^5—Ad^1—A^4—Ad^2—A^5 \qquad (IV)\text{-}1$$

wherein $A^4$, $Ad^1$ and $Ad^2$ are as defined in the formula (IV), and $A^5$ is a monovalent hydrocarbon group, a compound of the formula (IV)-2

$$A^5—Ad^1—A^4—H \qquad (IV)\text{-}2$$

wherein $A^4$ and $Ad^1$ are as defined in the formula (IV), and $A^5$ is a monovalent hydrocarbon group, and a compound of the formula (IV)-3

wherein $A^4$ and $Ad^1$ are as defined in the formula (IV), and $A^5$ is a divalent hydrocarbon group or a single bond.

In the formulas (IV), (IV)-1 and (IV)-2, preferred examples of the monovalent hydrocarbon group of $A^5$ include an alkyl group, an aryl group or an aralkyl group. Preferably, the alkyl group is an alkyl group having 1 to 20 carbon atoms, the aryl group is an aryl group having 1 to 20 carbon atoms, and the aralkyl group is an aralkyl group having 1 to 20 carbon atoms.

In the formula (IV) and (IV)-3, preferred examples of the divalent hydrocarbon group of $A^5$ include an alkylene group, an arylene group and an aralkylene group. Preferably, the alkylene group is an alkylene group having 1 to 20 carbon atoms, the arylene group is an arylene group having 1 to 20 carbon atoms, and the aralkylene group is an aralkylene group having 1 to 20 carbon atoms.

$A^4$ is a divalent hydrocarbon group, and examples thereof are the same as those of the divalent hydrocarbon group of $A^5$.

Each of $Ad^1$ and $Ad^2$ is independently an acid anhydride group selected from the group consisting of —SO$_2$—O—SO$_2$—, —SO$_2$—O—CO— and —CO—O—SO$_2$—. The acid anhydride group is an acid anhydride group (—SO$_2$—O—SO$_2$—) between sulfonic acids or an acid anhydride group (—SO$_2$—O—CO— or —CO—O—SO$_2$—) between sulfonic acid and carboxylic acid.

Such a sulfonic acid compound includes monovalent and divalent sulfonic acid compounds. Specific examples of the sulfonic acid compound include methylsulfonic acid, ethylsulfonic acid, propylsulfonic acid, butylsulfonic acid, hexylsulfonic acid, decylsulfonic acid, hexadecylsulfonic acid, benzenesulfonic acid, p-toluenesulfonic acid, dodecylbenzenesulfonic acid, octadecylbenzenesulfonic acid, benzenedisulfonic acid and toluenedisulfonic acid.

Likewise, the carboxylic acid compound includes monovalent and divalent carboxylic acid compounds. Specific examples of the carboxylic acid compound include acetic acid, propionic acid, butyric acid, valeric acid, stearic acid, myristic acid, oleic acid, benzoic acid, phenylacetic acid, toluic acid, succinic acid, glutaric acid, adipic acid, phthalic acid, isophthalic acid and terephthalic acid.

Specific examples of the compound of the formula (IV) are as follows.

Compounds of the formula (IV)-1:

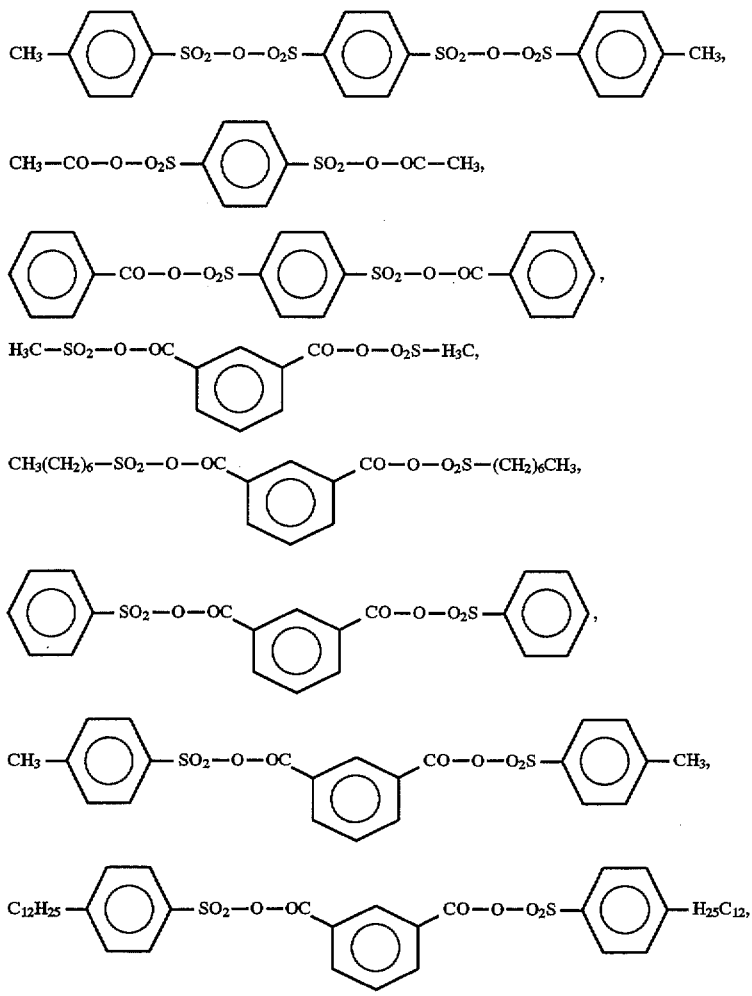
Compounds of the formula (IV)-2:
$(CH_3SO_2)_2O$, $(CH_3CH_2SO_2)_2O$, $(CH_3(CH_2)_3SO_2)_2O$,
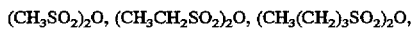
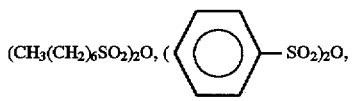
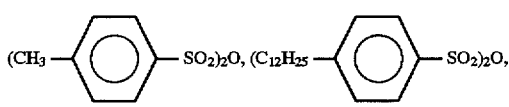
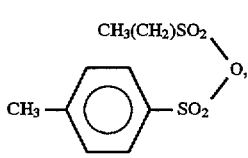
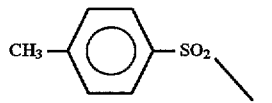
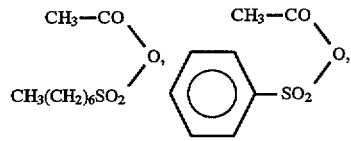
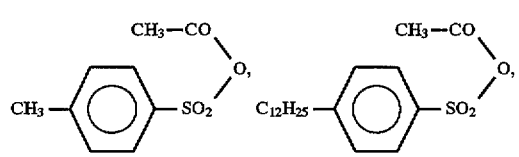

-continued

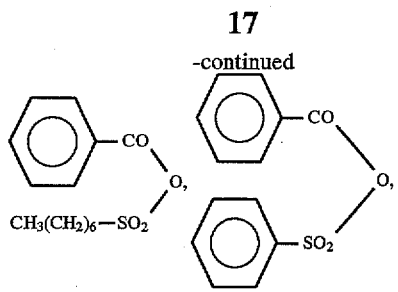

Compounds of the formula (IV)-3:

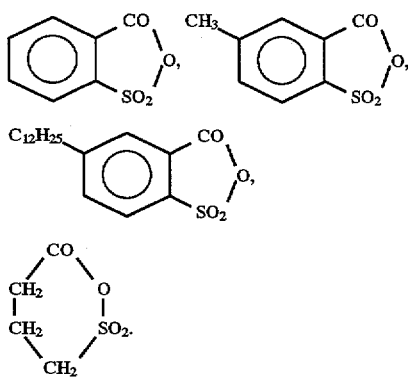

Among the stabilizers of the formulas (I) to (IV), phosphonium salt or ammonium salt type stabilizers ($X^1$, $X^2$ and $X^3$ in the formulas (I) to (III) is a phosphonium cation or an ammonium cation) are especially stable even above 200°.

In the process of this invention, at least one stabilizer selected from the group consisting of the compounds of the formulas (I) to (IV) is added in an amount of 0.01 to 500 ppm, preferably 0.01 to 300 ppm, more preferably 0.01 to 100 ppm of the polycarbonate to be formed.

It is advisable that the stabilizer is used in an amount of 0.5 to 50 mols per mol of the polycondensation catalyst.

The stabilizer is added after the polycondensate shows an intrinsic viscosity of at least 0.1, for example, at least 0.2, preferably at least 0.3. The addition of the stabilizer deactivates the polycondensation catalyst, thereby forming a polycarbonate having a desired intrinsic viscosity.

When the desired intrinsic viscosity of the polycarbonate to be formed is within the range of 0.3 to 1.0, it is advisable that the stabilizer is added after the polycondensate shows an intrinsic viscosity of, for example, at least 0.3.

A method for adding the stabilizer to the polycondensate is not limited in particular. For example, while a polycarbonate as a reaction product is in a molten state, the stabilizer may be added thereto, or after the polycarbonate is once pelletized and then remelted, the stabilizer may be added thereto. In the former method, while the molten polycarbonate after the polycondensation reaction, which is a reaction product, in a reactor or an extruder is still in the molten state, the stabilizer may be added, followed by pelletizing the resulting polycarbonate through an extruder. Or while the polycarbonate obtained by the polycondensation reaction is pelletized through the extruder from the reactor, it can be kneaded with the stabilizer to obtain the final polycarbonate.

In the process for the production of the polycarbonate in this invention, it is also advisable to add an epoxy compound along with the above stabilizer. On this occasion, an epoxy compound having at least one epoxy group in one molecule is used. Specific examples of the epoxy compound include an epoxidized soybean oil, an epoxidized linseed oil, phenyl glycidyl ether, allyl glycidyl ether, tert-butylphenyl glycidyl ether, 3,4-epoxycyclohexylmethyl-3,4'-epoxycyclohexyl carboxylate, 3,4-epoxy-6-methylcylohexylmethyl-3',4'-epoxy-6'-methylcyclohexyl carboxylate, 2,3-epoxycyclohexylmethyl-3',4'-epoxycyclohexyl carboxylate, 4-(3,4-epoxy-5-methylcyclohexyl)butyl-3',4'-epoxycyclohexyl carboxylate, 3,4-epoxycyclohexylethyleneoxide, cyclohexylmethyl-3,4-epoxycyclohexyl carboxylate, 3,4-epoxy-6-methylcyclohexylmethyl-6'-methylcyclohexyl carboxylate, bisphenol A glycidyl ether, tetrabromobisphenol A glycidyl ether, diglycidyl phthalate, diglycidyl hexahydrophthalate, bis-epoxydicyclopentadienyl ether, bis-epoxyethylene glycol, bis-epoxycyclohexyl adipate, butadiene diepoxide, tetraphenylethylene epoxide, octyl epoxyphthalate, epoxidized polybutadiene, 3,4-dimethyl- 1,2-epoxycyclohexane, 3,5-dimethyl-1,2-epoxycyclohexane, 3-methyl-5-tert-butyl-1,2-epoxycyclohexane, octadecyl-2,2-dimethyl-3,4-epoxycyclohexyl carboxylate, N-butyl-2,2-dimethyl-3,4-epoxycyclohexyl carboxylate, cyclohexyl-2-methyl-3,4-epoxycyclohexyl carboxylate, N-butyl-2-isopropyl-3,4-epoxy-5-methylcyclohexyl carboxylate, octadecyl-3,4-epoxycyclohexyl carboxylate, 2-ethylhexyl-3',4'-epoxycyclohexyl carboxylate, 4,6-dimethyl-2,3-epoxycyclohexyl-3',4'-epoxycyclohexyl carboxylate, 4,5-epoxytetrahydrophthalic anhydride, 3-tert-butyl-4,5-epoxytetrahydrophthalic anhydride, diethyl-4,5-epoxy-cis-1,2-cyclohexyl dicarboxylate, and di-n-butyl-3-tert-butyl-4,5-epoxy-cis-1,2-cyclohexyl dicarboxylate.

They may be used either singly or in combination. Of these compounds, the alicyclic epoxy compounds are preferable, and 3,4-epoxycyclohexylmethyl-3',4'-epoxycyclohexyl carboxylate is especially preferable.

In this invention, the epoxy compound is added in an amount of 1 to 2,000 ppm, preferably 1 to 1,000 ppm of the polycarbonate.

When the epoxy compound is added in the above range of the amount, the stabilizer is, even if it excessively remains in the polycarbonate, reacted with the epoxy compound to deactivate the excessive stabilizer, whereby the polycarbonate excellent in hue stability and heat resistance and having improved water resistance in particular is finally obtained.

In the process for the production of the polycarbonate in this invention, a phosphorus compound may be also added along with the above stabilizer. Examples of the phosphorus compound include phosphoric acid, phosphorous acid, hypophosphorous acid, polyphosphoric acid, a phosphate ester, and a phosphite ester.

Specific examples of the phosphate ester include trialkyl phosphates such as trimethyl phosphate, triethyl phosphate, tributyl phosphate, trioctyl phosphate, tridecyl phosphate, trioctadecyl phosphate, distearylpentaerythrityl diphosphate, tosyl(2-chloroethyl) phosphate, and tris(2,3-dichloropropyl) phosphate; tricycloalkyl phosphates such as tricyclohexyl phosphate; and triaryl phosphates such as triphenyl phosphate, tricresyl phosphate, tris(nonylphenyl) phosphate and 2-ethylphenyldiphenyl phosphate.

As the phosphite ester, a compound of the following formula can be mentioned.

$$P(OR^1)_3$$

wherein each of $R^1$s is independently an alicyclic hydrocarbon group, an aliphatic hydrocarbon group or an aromatic hydrocarbon group.

Specific examples of the compound of the above formula include trialkyl phosphites such as trimethyl phosphite, triethyl phosphite, tributyl phosphite, trioctyl phosphite, tris(2-ethylhexyl) phosphite, trinonyl phosphite, tridecyl phosphite, trioctadecyl phosphite, tristearyl phosphite, tris(2-chloroethyl) phosphite and tris(2,3-dichloropropyl) phosphite; tricycloalkyl phosphites such as tricyclohexyl phosphite; arylalkyl phosphites such as triphenyl phosphite, tricresyl phosphite, tris(ethylphenyl) phosphite, tris(2,4-di-tert-butylphenyl) phosphite, tris(nonylphenyl) phosphite and tris(hydroxyphenyl) phosphite; and arylalkyl phosphites such as phenyldidecyl phosphite, diphenyldecyl phosphite, diphenylisooctyl phosphite, phenylisooctyl phosphite and 2-ethylhexyldiphenyl phosphite.

Further examples of the phosphite ester include distearylpentaerythrityl diphosphite, and bis(2,4-di-tert-butylphenyl) pentaerythrityl diphosphite.

Of these compounds, tris(2,4-di-tert-butylphenyl) phosphite is especially preferable.

These compounds can be used either singly or in combination. They may be added either separately or simultaneously. In this invention, the phosphorus compound can be added in an amount of 10 to 1,000 ppm, preferably 50 to 500 ppm of the polycarbonate resin.

In this invention, a method for adding the epoxy compound and the phosphorus compound to the polycarbonate as a reaction product is not limited in particular. For example, they may be added while the polycarbonate as the reaction product is in the molten state or after the polycarbonate is once pelletized and then remelted. In the former method, while the molten polycarbonate after the polycondensation reaction, which is the reaction product, in the reactor or the extruder is still in the molten state, the epoxy compound and the phosphorus compound are added thereto, followed by pelletizing the resulting polycarbonate through the extruder. Or while the polycarbonate obtained by the polycondensation reaction is pelletized through the extruder from the reactor, said compounds can be added thereto and the mixture be kneaded to obtain the final polycarbonate.

On this occasion, the epoxy compound and the phosphorus compound may be added either simultaneously or separately. Further, when these compounds are added in combination, the order of their addition is not restricted in particular.

In this invention, the above-obtained polycarbonate may contain a heat stabilizer, an ultraviolet absorber, a mold release agent, a colorant, an antistatic agent, a slip agent, an antilocking agent, a lubricant, an antifogging agent, a natural oil, a synthetic oil, a wax, an organic filler, and an inorganic filler in such ranges as not to impair the object of this invention. The additives may be added either simultaneously with, or separately from, the aromatic dihydroxy compound.

Examples of the heat stabilizer include a phenolic stabilizer, an organic thioether-type stabilizer, and a hindered amine-type stabilizer.

Examples of the phenolic stabilizer include n-octadecyl-3-(4-hydroxy-3',5'-di-tert-butylphenyl)propionate, tetrakis [methylene-3-(3',5'-di-tert-butyl-4-hydroxyphenyl) propionate]methane, 1,1,3-tris(2-methyl-4-hydroxy-5-tert-butylphenyl)butane, distearyl(4-hydroxy-3-methyl-5-tert-butyl)benzyl malonate, and 4-hydroxymethyl-2,6-di-tert-butylphenol. They may be used either singly or in combination.

Examples of the thioether-type stabilizer include dilauryl, thiodipropionate, distearyl thiodipropionate, dimyristyl-3,3'-thiodipropionate, ditridecyl-3,3'-thiodipropionate, and pentaerythritol-tetrakis-(β-laurylthiopropionate). They may be used either singly or in combination.

Examples of the hindered amine-type stabilizer include bis(2,2,6,6-tetramethyl-4-piperidyl) sebacate, bis(1,2,2,6,6-pentamethyl-4-piperidyl) sebacate, 1-[2-{3-(3,5-di-tert-butyl-4-hydroxyphenyl)propionyloxy}ethyl]-4-{3-(3,5-di-tert-butyl-4-hydroxyphenyl)propionyloxy}-2,2,6,6-tetramethylpiperidine, 8-benzyl-7,7,9,9-tetramethyl-3-octyl-1,2,3-triazaspiro[4,5]undecane-2,4-dione, 4-benzyloxy-2,2,6,6-tetramethylpiperidine, 2-(3,5-di-tert-butyl-4-hydroxybenzyl)-2-n-butylmalic acid-bis(1,2,2,6,6-pentamethyl-4-piperidyl), and tetrakis(2,2,6,6-tetramethyl-4-piperidyl) 1,2,3,4-butanetetracarboxylate.

They may be used either singly or in combination. The heat stabilizer is used in an amount of 0.001 to 5 parts by weight, preferably 0.005 to 0.5 part by weight, more preferably 0.01 to 0.3 part by weight per 100 parts by weight of the polycarbonate.

Such a heat stabilizer may be added in a solid state or in a liquid state. It is advisable that the heat stabilizer is added while the polycarbonate is in a molten state between cooling in the final polymerization reactor and pelletizing. This decreases the number of heat exposures that the polycarbonate undergoes. Further, in heat treatment such as extrusion molding or pelletizing, the polycarbonate can suppress heat decomposition because it contains the heat stabilizer.

The ultraviolet absorber may be a general ultraviolet absorber, and is not limited in particular. Examples of the ultraviolet absorber include a salicylic acid-type ultraviolet absorber, a benzophenone-type ultraviolet absorber, a benzotriazole-type ultraviolet absorber and a cyanoacrylate-type ultraviolet absorber.

Specific examples of the salicylic acid-type ultraviolet absorber include phenyl salicylate and p-tert-butylphenyl salicylate. Examples of the benzophenone-type ultraviolet absorber include 2,4-dihydroxybenzophenone, 2-hydroxy-4-methoxybenzophenone, 2,2'-dihydroxy-4-methoxybenzophenone, 2,2'-dihydroxy-4,4'-dimethoxybenzophenone, 2-hydroxy-4-methoxy-2'-carboxybenzophenone, 2-hydroxy-4-methoxy-5-sulfobenzophenone trihydrate, 2-hydroxy-4-n-octoxybenzophenone, 2,2',4,4'-tetrahydroxybenzophenone, 4-dodecyloxy-2-hydroxybenzophenone, bis(5-benzoyl-4-hydroxy-2-methoxyphenyl)methane, and 2-hydroxy-4-methoxybenzophenone-5-sulfonic acid.

Examples of the benzotriazole-type ultraviolet absorber include 2-(2'-hydroxy-5'-methylphenyl)benzotriazole, 2-(2'-hydroxy-3',5'-di-tert-butylphenyl)benzotriazole, 2-(2'-hydroxy-3'-tert-butyl-5'-methylphenyl)-5-chlorobenzotriazole, 2-(2'-hydroxy-3',5'-di-tert-butylphenyl)-5-chlorobenzotriazole, 2-(2'-hydroxy-5'-tert-octylphenyl)benzotriazole, 2-(2'-hydroxy-3',5'-di-tert-amylphenyl)benzotriazole, 2-[2'-hydroxy-3'-(3",4",5",6"-tetrahydrophthalimidomethyl)-5'-methylphenyl] benzotriazole, and 2,2'-methylenebis[4-(1,1,3,3-tetramethylbutyl)-6-(2H-benzotriazol-2-yl)phenol].

Examples of the cyanoacrylate-type ultraviolet absorber include 2-ethylhexyl-2-cyano-3,3-diphenyl acrylate, and ethyl-2-cyano-3,3-diphenyl acrylate. They may be used either singly or in combination.

The ultraviolet absorber may be used in an amount of usually 0.001 to 5 parts by weight, preferably 0.005 to 1.0 part by weight, more preferably 0.01 to 0.5 part by weight per 100 parts by weight of the polycarbonate.

The mold release agent may be a general mold release agent, and is not limited in particular. Examples of a hydrocarbon-type mold release agent include natural and synthetic paraffins, polyethylene waxes, and fluorocarbons.

Examples of an aliphatic acid-type mold release agent include higher aliphatic acids and hydroxyaliphatic acids such as stearic acid and hydroxystearic acid. Examples of an aliphatic acid amide-type mold release agent include stearic acid amide and ethylenebisstearoamide, and alkylenebis aliphatic acid amides.

Examples of an alcohol-type mold release agent include aliphatic alcohols such as stearyl alcohol and cetyl alcohol, polyhydric alcohols, polyglycols and polyglycerols.

Examples of an aliphatic acid ester-type mold release agent include aliphatic acid lower alcohol esters such as butyl stearate and pentaerythritol tetrastearate, aliphatic acid polyhydric alcohol esters, and aliphatic acid polyglycol esters.

Examples of a silicone-type mold release agent include silicone oils.

They may be used either singly or in combination.

The mold release agent can be used in an amount of usually 0.001 to 5 parts by weight, preferably 0.005 to 1 part by weight, more preferably 0.01 to 0.5 part by weight per 100 parts by weight of the polycarbonate.

The colorant may be either a pigment or a dyestuff. The colorant include inorganic and organic colorants, and both of them may be used. Their use in combination is also available.

Examples of the inorganic colorant include oxides such as titanium dioxide and red oxide, hydroxides such as alumina white, sulfites such as zinc sulfite, selenides, phthalocyanines such as iron blue, chlomates such as zinc chlomate and molybdate red, sulfates such as barium sulfate, carbonates such as calcium carbonate, silicates such as ultramarine blue, phosphates such as manganese violet, carbon such as carbon black, and metallic powders such as bronze powder and aluminum powder.

Specific examples of the organic colorant include nitroso-type colorants such as naphthol green B, nitro-type colorants such as naphthol yellow S, azo-type colorants such as lithol red, bordeaux 10B, naphthol red and chromophthal yellow, phthalocyanine-type colorants such as phthalocyanine blue and fast sky blue, and condensed polycyclic colorants such as indanthone blue, quinacridone violet and dioxazine violet.

These colorants may be used either singly or in combination. The colorant can be used in an amount of usually $1 \times 10^{-6}$ to 5 parts by weight, preferably $1 \times 10^{-5}$ to 3 parts by weight, more preferably $1 \times 10^{-5}$ to 1 part by weight per 100 parts by weight of the polycarbonate.

The polycondensation reaction of the aromatic dihydroxy compound and the carbonic acid diester can be conducted under the same conditions as hitherto known polycondensation reaction conditions of an aromatic dihydroxy compound and a carbonic acid diester. Specifically, the reaction is first conducted at a temperature of 80° to 250° C., preferably 100° to 240° C., more preferably 120° to 230° C. for a period of 0 to 5 hours, preferably 0 to 4 hours, more preferably 0.25 to 3 hours under normal pressure. Then, while the pressure of the reaction system is reduced, the reaction temperature is elevated to conduct the reaction of the aromatic dihydroxy compound and the carbonic acid diester. Finally, the polycondensation reaction of the aromatic dihydroxy compound and the carbonic acid diester is conducted at a temperature of 200° to 320° C. under reduced pressure of 1 mmHg or less.

The above reaction of the aromatic dihydroxy compound and the carbonic acid diester may be conducted either continuously or batchwise. A reactor used in the above reaction may be a tank-type, a tube-type or a column-type reactor.

In accordance with this invention, when the stabilizer selected from the compounds of the formulas (I) to (IV) is used in producing the polycarbonate by the melt polymerization of the aromatic dihydroxy compound and the carbonic acid diester in the presence of the catalyst, the polycarbonate excellent in heat stability, melt moldability, resistance to hydrolysis and hue can be produced.

EXAMPLES

This invention will be illustrated by referring to the following Examples. However, this invention is not limited to these Examples.

In said Examples, the polycarbonate was measured for intrinsic viscosity [IV], melt viscosity change rate, properties after heat aging and resistance to hydrolysis, according to the following methods.

Intrinsic viscosity [IV]:

An intrinsic viscosity [IV] was measured in methylene chloride at 20° C. (dl/g).

Melt viscosity change rate:

A change of viscosity was measured at 270° C. for 30 minutes using an RAA-type flow analyzer of Rheometrics to find a change rate per minute. This change rate becomes a parameter of catalyst deactivation.

Properties after heat aging:

A polymer was subjected to heat aging at 320° C. for 15 minutes, and the properties after heat aging was evaluated according to an IV decrease rate (%) and a change of hue.

Resistance to hydrolysis:

A polymer was reacted in a water seal autoclave at 125° C. for 20 hours to find a rate of main chain breakage (%).

Examples 1 to 33

2,2'-Bis(4-hydroxyphenyl)propane [bisphenol A] (228 parts by weight), 214 parts by weight of diphenyl carbonate and a predetermined amount of a catalyst shown In Table 1-1 to Table 1-11 were charged into a reactor fitted with a stirrer, a pressure reduction device and a distillation column. They were stirred in an $N_2$ atmosphere at 180° C. for 30 minutes and dissolved.

Then, the mixture was reacted at the same temperature for 1 hour under reduced pressure of 100 mmHg while distilling off phenol. Further, while the temperature was elevated to 200° C., the pressure was reduced to 30 mmHg, and the reaction was performed at the same temperature for 1 hour under the same pressure. The reaction system was further heated to 280° C., and the pressure was reduced to 0.5 mmHg. The reaction was performed at the same temperature for 1 hour under the same pressure to obtain a resin.

The intrinsic viscosity (IV) before stabilizer addition of the above resins was measured. The results are shown in Tables 1-1 to 1-11.

Subsequently, each stabilizer of the kind and amount shown in Tables 1-1 to 1-11 was added to the resins in the molten state, and they were mixed under reduced pressure for a predetermined period of time. Then, the molten resins were fed into a twin-screw extruder (L/D=20, barrel temperature 290° C.) by a gear pump. At this time, predetermined amounts of a phosphorus compound or a phenolic compound were added to the resins as required.

The finally-obtained polycarbonate resins were measured for intrinsic viscosity (IV), hue, melt viscosity change ratio, properties after heat aging and resistance to hydrolysis, and the results are shown in Tables 1-1 to 1-11.

Example 34

A polycarbonate was produced in the same manner as in Example 1 except that the reaction time at 280° C. under 0.5 mmHg in Example 1 was changed from 1 hour to 20 minutes.

The properties of the obtained polycarbonate resin was measured in the same manner as in Example 1. The results are shown in Table 1-12.

Example 35

A polycarbonate was produced in the same manner as Example 8 except 268 parts by weight of 1,1'-bis(4-hydroxyphenol)cyclohexane was used instead of 228 parts by weight of 2,2'-bis(4-hydroxyphenol)propane.

The properties of the resulting polycarbonate resin are shown in Table 1-12.

TABLE 1-1

|  |  |  | Example 1 | Example 2 | Example 3 |
|---|---|---|---|---|---|
| Catalyst |  | Kind | Bisphenol A disodium salt | Bisphenol A disodium salt | Sodium hydroxide |
|  |  | Amount (part by weight) | 0.0014 | 0.0014 | 0.0004 |
| Intrinsic viscosity (IV) before addition |  |  | 0.51 | 0.52 | 0.50 |
| Additives | Stabilizer | Kind | CH$_3$—⟨O⟩—SO$_3$—C(CH$_3$)$_2$—CH$_3$ | C$_{12}$H$_{25}$—⟨O⟩—SO$_3$—C(CH$_3$)$_2$—CH$_3$ | C$_{15}$H$_{31}$—SO$_3$—C(CH$_3$)$_2$—C$_{15}$H$_{31}$ |
|  |  | Amount (part by weight) | 0.0046 [2.0]* | 0.0077 [2.0]* | 0.0109 [2.0]* |
|  |  | Mixing time (min.) | 20 | 20 | 10 |
|  | Phosphorus compound | Kind | Tris(nonylphenyl)phosphite | — | Tris(nonylphenyl)phosphite |
|  |  | Amount (part by weight) | 0.025 | — | 0.025 |
|  | Phenolic compound | Kind | IRGANOX 245 | — | IRGANOX 1010 |
|  |  | Amount (part by weight) | 0.025 | — | 0.025 |
| Properties of the obtained polycarbonate | Intrinsic viscosity (IV) |  | 0.52 | 0.53 | 0.52 |
|  | Hue |  | Almost colorless | Almost colorless | Almost colorless |
|  | Melt viscosity change rate (%/min.) |  | 0.3 | 0.3 | 0.2 |
|  | Properties after heat aging (320° C./15 min.) | IV decrease rate (%) | 2 | 2 | 2 |
|  |  | Hue | Almost unchanged | Almost unchanged | Almost unchanged |
|  | Resistance to hydrolysis (%) |  | 3 | 3 | 3 |

*Amount (mol) of stabilizer per mol of the catalyst

TABLE 1-2

|  |  |  | Example 4 | Example 5 | Example 6 |
|---|---|---|---|---|---|
| Catalyst |  | Kind | Sodium acetate | Sodium stearate | Sodium salicylate |
|  |  | Amount (part by weight) | 0.0008 | 0.0061 | 0.0032 |
| Intrinsic viscosity (IV) before addition |  |  | 0.48 | 0.50 | 0.49 |
| Additives | Stabilizer | Kind | CH$_3$—⟨O⟩—SO$_3$N(C$_4$H$_9$)$_4$ | CH$_3$—⟨O⟩—SO$_3$N(C$_{16}$H$_{33}$)(CH$_3$)$_3$ | C$_{12}$H$_{25}$—⟨O⟩—SO$_3$N(C$_4$H$_9$)$_4$ |
|  |  | Amount (part by weight) | 0.0082 [2.0]* | 0.014 [1.5]* | 0.014 [1.2]* |
|  |  | Mixing time (min.) | 10 | 10 | 10 |
|  | Phosphorus compound | Kind | — | — | — |
|  |  | Amount (part by weight) | — | — | — |
|  | Phenolic compound | Kind | — | — | — |
|  |  | Amount (part by weight) | — | — | — |
| Properties of | Intrinsic viscosity (IV) |  | 0.50 | 0.51 | 0.50 |

TABLE 1-2-continued

| | | | Example 4 | Example 5 | Example 6 |
|---|---|---|---|---|---|
| the obtained poly-carbonate | Hue | | Almost colorless | Almost colorless | Almost colorless |
| | Melt viscosity change rate (%/min.) | | 0.4 | 0.3 | 0.5 |
| | Properties after heat aging (320° C./ 15 min.) | IV decrease rate (%) | 2 | 2 | 2 |
| | | Hue | Almost unchanged | Almost unchanged | Almost unchanged |
| | Resistance to hydrolysis (%) | | 5 | 5 | 6 |

TABLE 1-3

| | | | Example 7 | Example 8 | Example 9 |
|---|---|---|---|---|---|
| Catalyst | | Kind | Sodium hydroxide | Bisphenol A disodium salt | Tetramethylammonium hydroxide/sodium hydroxide |
| | | Amount (part by weight) | 0.0004 | 0.0014 | 0.0091/0.000004 |
| Intrinsic viscosity (IV) before addition | | | 0.52 | 0.53 | 0.51 |
| Additives | Stabilizer | Kind | $C_{15}H_{31}-SO_3N(C_4H_9)_4$ | $C_{12}H_{25}-\langle O\rangle-SO_3P(C_4H_9)_4$ | $C_{12}H_{25}-\langle O\rangle-SO_3P(C_4H_9)_4$ |
| | | Amount (part by weight) | 0.0107 [2.0]* | 0.012 [2.0]* | 0.00012 [2.0]* |
| | | Mixing time (min.) | 10 | 10 | 10 |
| | Phosphorus compound | Kind | — | Tris(nonylphenyl)phosphite | Triphenyl phosphite |
| | | Amount (part by weight) | — | 0.03 | 0.03 |
| | Phenolic compound | Kind | — | 2,6-di-tert-butyl-4-methylphenol | 2,6-di-tert-butyl-4-methylphenol |
| | | Amount (part by weight) | — | 0.03 | 0.03 |
| Properties of the obtained polycarbonate | Intrinsic viscosity (IV) | | 0.52 | 0.54 | 0.52 |
| | Hue | | Almost colorless | Almost colorless | Almost colorless |
| | Melt viscosity change rate (%/min.) | | 0.4 | 0.1 | 0.1 |
| | Properties after heat aging (320° C./ 15 min.) | IV decrease rate (%) | 3 | 1 | 2 |
| | | Hue | Almost unchanged | Almost unchanged | Almost unchanged |
| | Resistance to hydrolysis (%) | | 5 | 1 | 1 |

TABLE 1-4

| | | | Example 10 | Example 11 | Example 12 |
|---|---|---|---|---|---|
| Catalyst | | Kind | Tetramethylammonium hydroxide/sodium hydroxide | Sodium thiocyanate | Sodium acetate |
| | | Amount (part by weight) | 0.0091/0.000004 | 0.0008 | 0.0008 |
| Intrinsic viscosity (IV) before addition | | | 0.52 | 0.52 | 0.49 |
| Additives | Stabilizer | Kind | $C_{12}H_{25}-\langle O\rangle-SO_3P\begin{matrix}C_4H_9\\(C_6H_5)_3\end{matrix}$ | $C_{18}H_{37}-SO_3P(C_4H_9)_4$ | $C_{15}H_{31}-SO_3P\begin{matrix}C_{16}H_{33}\\(C_4H_9)_3\end{matrix}$ |
| | | Amount (part by weight) | 0.0003 [5.0]* | 0.012 [2.0]* | 0.036 [5.0]* |
| | | Mixing time (min.) | 10 | 10 | 10 |
| | Phosphorus compound | Kind | Triphenyl phosphite | Tris(nonylphenyl)phosphite | ADK STAB PEP-36 |
| | | Amount (part by weight) | 0.03 | 0.03 | 0.03 |
| | Phenolic | Kind | 2,6-di-tert-butyl-4-methylphenol | 2,6-di-tert-butyl-4-methylphenol | IRGANOX 1076 |

TABLE 1-4-continued

|  |  |  | Example 10 | Example 11 | Example 12 |
|---|---|---|---|---|---|
|  | compound | Amount (part by weight) | 0.03 | 0.03 | 0.03 |
| Properties of the obtained poly-carbonate | Intrinsic viscosity (IV) |  | 0.53 | 0.53 | 0.50 |
|  | Hue |  | Almost colorless | Almost colorless | Almost colorless |
|  | Melt viscosity change rate (%/min.) |  | 0.1 | 0.1 | 0.2 |
|  | Properties after heat aging (320° C./15 min.) | IV decrease rate (%) | 2 | 2 | 2 |
|  |  | Hue | Almost unchanged | Almost unchanged | Almost unchanged |
|  | Resistance to hydrolysis (%) |  | 2 | 1 | 2 |

TABLE 1-5

|  |  |  | Example 13 | Example 14 | Example 15 |
|---|---|---|---|---|---|
| Catalyst |  | Kind | Bisphenol A disodium salt | Bisphenol A disodium salt | Calcium hydroxide |
|  |  | Amount (part by weight) | 0.0014 | 0.0014 | 0.0004 |
| Intrinsic viscosity (IV) before addition |  |  | 0.52 | 0.50 | 0.49 |
| Additives | Stabilizer | Kind | $CH_3-\bigcirc-SO_3P(CH_3)_4$ | $C_{15}H_{31}-SO_3P(C_{10}H_{21})_4$ | $C_{12}H_{25}-\bigcirc-SO_3P(C_4H_9)_4$ |
|  |  | Amount (part by weight) | 0.012 [5.0]* | 0.018 [2.0]* | 0.029 [5.0]* |
|  |  | Mixing time (min.) | 15 | 10 | 15 |
|  | Phosphorus compound | Kind | ADK STAB PEP-36 | ADK STAB PEP-36 | — |
|  |  | Amount (part by weight) | 0.03 | 0.03 | — |
|  | Phenolic compound | Kind | IRGANOX 1076 | IRGANOX 1076 | — |
|  |  | Amount (part by weight) | 0.03 | 0.03 | — |
| Properties of the obtained poly-carbonate | Intrinsic viscosity (IV) |  | 0.52 | 0.51 | 0.50 |
|  | Hue |  | Almost colorless | Almost colorless | Almost colorless |
|  | Melt viscosity change rate (%/min.) |  | 0.2 | 0.3 | 0.2 |
|  | Properties after heat aging (320° C./15 min.) | IV decrease rate (%) | 3 | 2 | 2 |
|  |  | Hue | Almost unchanged | Almost unchanged | Almost unchanged |
|  | Resistance to hydrolysis (%) |  | 3 | 3 | 2 |

TABLE 1-6

|  |  |  | Example 16 | Example 17 | Example 18 |
|---|---|---|---|---|---|
| Catalyst |  | Kind | Bisphenol A disodium salt | Bisphenol A disodium salt | Bisphenol A disodium salt |
|  |  | Amount (part by weight) | 0.0014 | 0.0014 | 0.0014 |
| Intrinsic viscosity (IV) before addition |  |  | 0.52 | 0.52 | 0.55 |
| Additives | Stabilizer | Kind | $C_{12}H_{25}-OSO_3-\underset{\underset{CH_3}{\vert}}{\overset{\overset{CH_3}{\vert}}{C}}-CH_3$ | $C_{12}H_{25}-OSO_3-\underset{\underset{CH_3}{\vert}}{\overset{\overset{CH_3}{\vert}}{C}}-C_{12}H_{25}$ | $C_{12}H_{25}-OSO_3Na$ |
|  |  | Amount (part by weight) | 0.0048 [1.5]* | 0.0095 [2.0]* | 0.0043 [1.5]* |
|  |  | Mixing time (min.) | 10 | 10 | 20 |
|  | Phosphorus compound | Kind | ADK STAB PEP-36 | ADK STAB PEP-36 | — |
|  |  | Amount (part by weight) | 0.03 | 0.03 | — |
|  | Phenolic compound | Kind | IRGANOX 1076 | IRGANOX 1076 | — |
|  |  | Amount (part by weight) | 0.03 | 0.03 | — |
| Properties of the | Intrinsic viscosity (IV) |  | 0.52 | 0.53 | 0.55 |

TABLE 1-6-continued

|  |  | Example 16 | Example 17 | Example 18 |
|---|---|---|---|---|
| obtained poly-carbonate | Hue | Almost colorless | Almost colorless | Almost colorless |
|  | Melt viscosity change rate (%/min.) | 0.3 | 0.4 | 0.3 |
|  | Properties after heat aging (320° C./ 15 min.) IV decrease rate (%) | 2 | 2 | 2 |
|  | Hue | Almost unchanged | Almost unchanged | Almost unchanged |
|  | Resistance to hydrolysis (%) | 4 | 3 | 6 |

TABLE 1-7

|  |  |  | Example 19 | Example 20 | Example 21 |
|---|---|---|---|---|---|
| Catalyst |  | Kind | Bisphenol A disodium salt | Sodium acetate | Sodium acetate |
|  |  | Amount (part by weight) | 0.0014 | 0.0008 | 0.0008 |
| Intrinsic viscosity (IV) before addition |  |  | 0.54 | 0.54 | 0.51 |
| Additives | Stabilizer | Kind | CH₃—OSO₃N(C₁₄H₂₉)(CH₃)(H)(CH₃) | C₂H₅—OSO₃N(C₁₀H₂₁)(C₂H₅)(H)(H) | C₁₂H₂₅—OSO₃P(C₄H₉)₄ |
|  |  | Amount (part by weight) | 0.0035 [1.0]* | 0.0062 [2.0]* | 0.010 [2.0]* |
|  |  | Mixing time (min.) | 20 | 15 | 10 |
|  | Phosphorus compound | Kind | — | Trilauryl thiophosphite | Trilauryl thiophosphite |
|  |  | Amount (part by weight) | — | 0.025 | 0.025 |
|  | Phenolic compound | Kind | — | 2,6-di-tert-butyl-4-methylphenol | 2,6-di-tert-butyl-4-methylphenol |
|  |  | Amount (part by weight) | — | 0.025 | 0.025 |
| Properties of the obtained poly-carbonate | Intrinsic viscosity (IV) |  | 0.54 | 0.55 | 0.52 |
|  | Hue |  | Almost colorless | Almost colorless | Almost colorless |
|  | Melt viscosity change rate (%/min.) |  | 0.3 | 0.3 | 0.3 |
|  | Properties after heat aging (320° C./ 15 min.) | IV decrease rate (%) | 2 | 3 | 2 |
|  |  | Hue | Almost unchanged | Almost unchanged | Almost unchanged |
|  | Resistance to hydrolysis (%) |  | 7 | 7 | 5 |

TABLE 1-8

|  |  |  | Example 22 | Example 23 | Example 24 |
|---|---|---|---|---|---|
| Catalyst |  | Kind | Bisphenol A disodium salt | Bisphenol A disodium salt | Bisphenol A disodium salt |
|  |  | Amount (part by weight) | 0.0014 | 0.0014 | 0.0014 |
| Intrinsic viscosity (IV) before addition |  |  | 0.52 | 0.52 | 0.51 |
| Additives | Stabilizer | Kind | t-C₄H₉O₃S—C₁₅H₃₀—SO₃-t-C₄H₉ | C₆H₄(SO₃P(C₄H₉)₄)₂ | (CH₃)₃N—C₃H₆—SO₃ |
|  |  | Amount (part by weight) | 0.0045 [2.0]* | 0.0076 [2.0]* | 0.0036 [2.0]* |
|  |  | Mixing time (min.) | 10 | 10 | 10 |
|  | Phosphorus compound | Kind | ADK STAB PEP-36 | ADK STAB PEP-36 | — |
|  |  | Amount (part by weight) | 0.03 | 0.03 | — |
|  | Phenolic compound | Kind | IRGANOX 1076 | IRGANOX 1076 | — |
|  |  | Amount (part by weight) | 0.03 | 0.03 | — |

TABLE 1-8-continued

|  |  | Example 22 | Example 23 | Example 24 |
|---|---|---|---|---|
| Properties of the obtained polycarbonate | Intrinsic viscosity (IV) | 0.52 | 0.53 | 0.52 |
|  | Hue | Almost colorless | Almost colorless | Almost colorless |
|  | Melt viscosity change rate (%/min.) | 0.2 | 0.2 | 0.5 |
|  | Properties after heat aging (320° C./15 min.) IV decrease rate (%) | 2 | 3 | 3 |
|  | Properties after heat aging (320° C./15 min.) Hue | Almost unchanged | Almost unchanged | Almost unchanged |
|  | Resistance to hydrolysis (%) | 4 | 3 | 6 |

TABLE 1-9

|  |  |  | Example 25 | Example 26 | Example 27 |
|---|---|---|---|---|---|
| Catalyst |  | Kind | Bisphenol A disodium salt | Tetramethylammonium hydroxide/sodium hydroxide | Bisphenol A disodium salt |
|  |  | Amount (part by weight) | 0.0014 | 0.0091/0.000014 | 0.0014 |
| Intrinsic viscosity (IV) before addition |  |  | 0.50 | 0.51 | 0.50 |
| Additives | Stabilizer | Kind | $(C_6H_5)_3P-C_{15}H_{30}-SO_3$ | $[(C_6H_5)_3P-(CH_2)_{10}-P(C_6H_5)_3] \cdot [(CH_3-\bigcirc-SO_3)_2]$ | $[(C_4H_9)_3N-(CH_2)_{15}-N(C_4H_9)_3] \cdot [(C_{15}H_{31}-SO_3)_2]$ |
|  |  | Amount (part by weight) | 0.011 [2.0]* | 0.0003 [1.5]* | 0.012 [2.0]* |
|  |  | Mixing time (min.) | 10 | 10 | 10 |
|  | Phosphorus compound | Kind | — | IRGAFOS 168 | IRGAFOS 168 |
|  |  | Amount (part by weight) | — | 0.03 | 0.03 |
|  | Phenolic compound | Kind | — | IRGANOX 245 | IRGANOX 245 |
|  |  | Amount (part by weight) | — | 0.03 | 0.03 |
| Properties of the obtained polycarbonate | Intrinsic viscosity (IV) |  | 0.50 | 0.52 | 0.51 |
|  | Hue |  | Almost colorless | Almost colorless | Almost colorless |
|  | Melt viscosity change rate (%/min.) |  | 0.3 | 0.2 | 0.4 |
|  | Properties after heat aging (320° C./15 min.) | IV decrease rate (%) | 3 | 2 | 3 |
|  | Properties after heat aging (320° C./15 min.) | Hue | Almost unchanged | Almost unchanged | Almost unchanged |
|  | Resistance to hydrolysis (%) |  | 4 | 2 | 5 |

TABLE 1-10

|  |  | Example 28 | Example 29 | Example 30 |
|---|---|---|---|---|
| Catalyst | Kind | Bisphenol A disodium salt | Bisphenol A disodium salt | Sodium acetate |
|  | Amount (part by weight) | 0.0014 | 0.0028 | 0.0008 |
| Intrinsic viscosity (IV) before addition |  | 0.52 | 0.48 | 0.51 |
| Additives | Stabilizer Kind | $[(C_6H_5)_3P-(CH_2)_{10}-P(C_6H_5)_3] \cdot [(C_{12}H_{25}-OSO_3)_2]$ | $(CH_3-\bigcirc-SO_2)_2O$ | $(C_7H_{15}-SO_2)_2O$ |
|  | Amount (part by weight) | 0.012 [2.0]* | 0.0065 [2.0]* | 0.0068 [4.0]* |
|  | Mixing time (min.) | 10 | 10 | 10 |
|  | Phosphorus compound Kind | IRGAFOS 168 | Tri(2,4-di-tert-butylphenyl)-phosphite | — |
|  | Amount (part by weight) | 0.03 | 0.025 | — |
|  | Phenolic compound Kind | IRGANOX 245 | IRGANOX 245 | — |
|  | Amount (part by weight) | 0.03 | 0.025 | — |
| Properties of the obtained poly- | Intrinsic viscosity (IV) | 0.52 | 0.49 | 0.52 |
|  | Hue | Almost colorless | Almost colorless | Almost colorless |
|  | Melt viscosity change rate (%/min.) | 0.4 | 0.2 | 0.3 |

TABLE 1-10-continued

|  |  |  | Example 28 | Example 29 | Example 30 |
|---|---|---|---|---|---|
| carbonate | Properties after heat aging (320° C./ 15 min.) | IV decrease rate (%) | 3 | 2 | 4 |
|  |  | Hue | Almost unchanged | Almost unchanged | Almost unchanged |
|  |  | Resistance to hydrolysis (%) | 5 | 2 | 1 |

TABLE 1-11

|  |  |  | Example 31 | Example 32 | Example 33 |
|---|---|---|---|---|---|
| Catalyst |  | Kind | Sodium acetate | Bisphenol A disodium salt | Bisphenol A disodium salt |
|  |  | Amount (part by weight) | 0.0008 | 0.0028 | 0.0028 |
| Intrinsic viscosity (IV) before addition |  |  | 0.50 | 0.503 | 0.49 |
| Additives | Stabilizer | Kind | 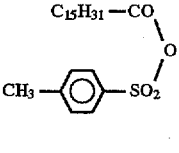 | 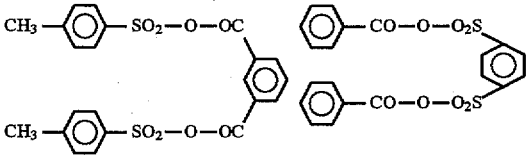 | 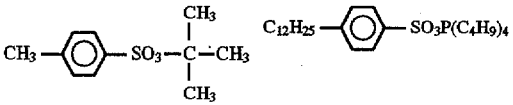 |
|  |  | Amount (part by weight) | 0.0059 [1.5]* | 0.0071 [1.5]* | 0.0089 [2.0]* |
|  |  | Mixing time (min.) | 10 | 10 | 10 |
|  | Phosphorus compound | Kind | Tris(nonylphenyl)phosphite | Triphenyl phosphite | Triphenyl phosphite |
|  |  | Amount (part by weight) | 0.025 | 0.025 | 0.025 |
|  | Phenolic compound | Kind | IRGANOX 259 | IRGANOX 259 | IRGANOX 259 |
|  |  | Amount (part by weight) | 0.025 | 0.025 | 0.025 |
| Properties of the obtained polycarbonate | Intrinsic viscosity (IV) |  | 0.51 | 0.51 | 0.49 |
|  | Hue |  | Almost colorless | Almost colorless | Almost colorless |
|  | Melt viscosity change rate (%/min.) |  | 0.2 | 0.2 | 0.2 |
|  | Properties after heat aging (320° C./ 15 min.) | IV decrease rate (%) | 2 | 2 | 2 |
|  |  | Hue | Almost unchanged | Almost unchanged | Almost unchanged |
|  | Resistance to hydrolysis (%) |  | 3 | 2 | 2 |

TABLE 1-12

|  |  |  | Example 34 | Example 35 |
|---|---|---|---|---|
| Catalyst |  | Kind | Bisphenol A disodium salt | Bisphenol A disodium salt |
|  |  | Amount (part by weight) | 0.0014 | 0.0014 |
| Intrinsic viscosity (IV) before addition |  |  | 0.31 | 0.51 |
| Additives | Stabilizer | Kind | CH$_3$—⟨O⟩—SO$_3$—C(CH$_3$)$_2$—CH$_3$ | C$_{12}$H$_{25}$—⟨O⟩—SO$_3$P(C$_4$H$_9$)$_4$ |
|  |  | Amount (part by weight) | 0.0046 [2.0]* | 0.012 [2.0]* |
|  |  | Mixing time (min.) | 10 | 10 |
|  | Phosphorus compound | Kind | Tris(nonylphenyl)phosphite | Tris(nonylphenyl)phosphite |
|  |  | Amount (part by weight) | 0.025 | 0.03 |
|  | Phenolic compound | Kind | IRGANOX 1010 | 2,6-di-tert-butyl-4-methylphenol |
|  |  | Amount (part by weight) | 0.025 | 0.03 |
| Properties of the obtained polycarbonate | Intrinsic viscosity (IV) |  | 0.31 | 0.52 |
|  | Hue |  | Almost colorless | Almost colorless |
|  | Melt viscosity change rate (%/min.) |  | 0.2 | 0.1 |
|  | Properties after heat aging | IV decrease rate (%) | 3 | 1 |
|  |  | Hue | Almost unchanged | Almost unchanged |

TABLE 1-12-continued

| | Example 34 | Example 35 |
|---|---|---|
| (320° C./15 min.) Resistance to hydrolysis (%) | 2 | 1 |

What is claimed is:

1. A process for producing a stabilized polycarbonate which comprises:

melt-polycondensing an aromatic dihydroxy compound and a carbonic acid diester in the presence of a polycondensation catalyst to obtain a reaction mixture; and after the reaction mixture has an intrinsic viscosity of at least 0.1, adding at least one stabilizer in an amount of 0.01 to 300 ppm of the polycarbonate to be formed, said stabilizer selected from the group consisting of compounds having the formula (I)

$$A^1\text{—}(Y^1\text{—}SO_3X^1)_m \qquad (I)$$

wherein $A^1$ is a hydrocarbon group having a valence of m, which may be substituted, $Y^1$ is a single bond or an oxygen atom, $X^1$ is a secondary alkyl group, a tertiary alkyl group, an ammonium cation having the formula (I-a)

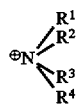

$$(I\text{-}a)$$

wherein each of $R^1$, $R^2$, $R^3$ and $R^4$ is independently a hydrogen atom or a monovalent hydrocarbon group, or a phosphonium cation having the formula (I-b)

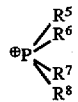

$$(I\text{-}b)$$

wherein each of $R^5$, $R^6$, $R^7$ and $R^8$ is independently a hydrogen atom or a monovalent hydrocarbon group, and m is an integer of 1 to 4, to produce the stabilized polycarbonate.

2. The process of claim 1, wherein $A^1$ in the formula (I) is a saturated aliphatic hydrocarbon group, an aromatic hydrocarbon group or a saturated aliphatic-aromatic hydrocarbon group, each of these groups having a valence of m.

3. The process of claim 1, wherein m in the formula (I) is 1 or 2.

4. The process of claim 1, wherein the stabilizer is a compound of the formula (I)-1

$$A^1\text{—}SO_3X^1 \qquad (I)\text{-}1$$

wherein $A^1$ and $X^1$ are as defined in the formula (I).

5. The process of claim 4, wherein $A^1$ in the formula (I)-1 is a group of the formula (I)-c

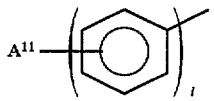

$$(I)\text{-}c$$

wherein $A^{11}$ is an alkyl group having 1 to 18 carbon atoms, and l is an integer of 0 or 1.

6. The process of claim 1, wherein the stabilizer has the formula (I)-2

$$A^1\text{—}O\text{—}SO_3X^1 \qquad (I)\text{-}2$$

wherein $A^1$ and $X^1$ are as defined in the formula (I).

7. The process of claim 6, wherein $A^1$ in the formula (I)-2 is an alkyl group having 1 to 18 carbon atoms.

8. The process of claim 1, wherein the polycondensation catalyst is selected from the group consisting of an alkali metal compound, an alkaline earth metal compound and a nitrogen-containing basic compound.

9. The process of claim 1, wherein the stabilizer is used in an amount of 0.5 to 50 mols per mole of the polycondensation catalyst.

10. The process of claim 1, wherein the stabilizer is added after the polycarbonate shows an intrinsic viscosity of at least 0.2.

11. The process of claim 1, wherein the stabilizer is added after the polycarbonate shows an intrinsic viscosity of at least 0.3.

12. The process of claim 1, wherein the desired intrinsic viscosity of the polycarbonate to be formed is in the range of from 0.3 to 1.0.

13. The process of claim 1, wherein the stabilizer is selected from the group consisting of compounds having the formula (I) in which $X^1$ is a secondary alkyl group or a tertiary alkyl group.

14. The process of claim 1, wherein the stabilizer is selected from the group consisting of compounds having the formula (I) in which $X^1$ is an ammonium cation having the formula (I-a).

15. The process of claim 1, wherein the stabilizer is selected from the group consisting of compounds having the formula (I) in which $X^1$ is a phosphonium cation having the formula (I-b).

16. The process of claim 1, wherein the polycondensation catalyst is used in an amount of 0.01 to 100 ppm of the polycarbonate to be formed.

* * * * *